US006978419B1

(12) United States Patent
Kantrowitz

(10) Patent No.: US 6,978,419 B1
(45) Date of Patent: Dec. 20, 2005

(54) METHOD AND APPARATUS FOR EFFICIENT IDENTIFICATION OF DUPLICATE AND NEAR-DUPLICATE DOCUMENTS AND TEXT SPANS USING HIGH-DISCRIMINABILITY TEXT FRAGMENTS

(75) Inventor: Mark Kantrowitz, Pittsburgh, PA (US)

(73) Assignee: Justsystem Corporation, Tokushima (JP)

( * ) Notice: Subject to any disclaimer, the term of this patent is extended or adjusted under 35 U.S.C. 154(b) by 951 days.

(21) Appl. No.: 09/713,733

(22) Filed: Nov. 15, 2000

(51) Int. Cl.⁷ ............................................ G06F 15/00
(52) U.S. Cl. ...................................... 715/511; 715/500
(58) Field of Search ......... 715/511, 500, 530; 707/3–6

(56) References Cited

U.S. PATENT DOCUMENTS

| | | | | |
|---|---|---|---|---|
| 4,807,182 | A | | 2/1989 | Queen .......................... 364/900 |
| 5,258,910 | A | * | 11/1993 | Kanza et al. ................. 715/531 |
| 5,544,049 | A | * | 8/1996 | Henderson et al. ............. 704/7 |
| 5,634,051 | A | | 5/1997 | Thomson ...................... 395/605 |
| 5,680,611 | A | | 10/1997 | Rail et al. ..................... 395/612 |
| 5,771,378 | A | * | 6/1998 | Holt et al. ....................... 707/5 |
| 5,898,836 | A | | 4/1999 | Freivald et al. ......... 395/200.48 |
| 5,913,208 | A | | 6/1999 | Brown et al. ................... 707/3 |
| 5,933,823 | A | * | 8/1999 | Cullen et al. ................... 707/6 |
| 5,978,828 | A | | 11/1999 | Greer et al. ................ 709/2.24 |
| 5,983,216 | A | * | 11/1999 | Kirsch et al. ................... 707/2 |
| 6,070,158 | A | * | 5/2000 | Kirsch et al. ................... 707/3 |
| 6,092,065 | A | * | 7/2000 | Floratos et al. ................ 707/6 |
| 6,098,034 | A | * | 8/2000 | Razin et al. .................... 704/9 |
| 6,104,990 | A | * | 8/2000 | Chaney et al. ................. 704/9 |
| 6,119,124 | A | * | 9/2000 | Broder et al. ........... 707/103 R |
| 6,185,614 | B1 | * | 2/2001 | Cuomo et al. ............... 709/224 |
| 6,240,409 | B1 | * | 5/2001 | Aiken ............................ 707/4 |
| 6,246,977 | B1 | * | 6/2001 | Messerly et al. ............... 704/9 |
| 6,263,348 | B1 | * | 7/2001 | Kathrow et al. ............ 707/203 |
| 6,295,529 | B1 | * | 9/2001 | Corston-Oliver et al. ....... 707/3 |
| 6,353,824 | B1 | * | 3/2002 | Boguraev et al. ............... 707/5 |
| 6,353,827 | B1 | * | 3/2002 | Davies et al. ................... 707/6 |
| 6,356,633 | B1 | * | 3/2002 | Armstrong ............. 379/265.11 |
| 6,366,950 | B1 | * | 4/2002 | Scheussler et al. ......... 709/206 |
| 6,442,606 | B1 | * | 8/2002 | Subbaroyan et al. ........ 709/224 |
| 6,470,307 | B1 | * | 10/2002 | Turney .......................... 704/9 |
| 6,473,753 | B1 | * | 10/2002 | Katariya et al. ................ 707/4 |
| 6,546,490 | B2 | * | 4/2003 | Sako et al. .................. 713/193 |
| 6,547,829 | B1 | * | 4/2003 | Meyerzon et al. ........ 715/501.1 |
| 6,549,897 | B1 | * | 4/2003 | Katariya et al. ................ 707/5 |
| 6,598,054 | B2 | * | 7/2003 | Schuetze et al. ......... 707/103 R |
| 6,615,209 | B1 | * | 9/2003 | Gomes et al. .................. 707/5 |
| 6,628,824 | B1 | * | 9/2003 | Belanger .................... 382/165 |
| 6,643,686 | B1 | * | 11/2003 | Hall ........................... 709/206 |
| 6,658,423 | B1 | * | 12/2003 | Pugh et al. .................. 707/102 |
| 6,697,998 | B1 | * | 2/2004 | Damerau et al. ........... 715/512 |
| 6,718,363 | B1 | * | 4/2004 | Ponte ......................... 709/203 |
| 6,741,743 | B2 | * | 5/2004 | Stalcup et al. .............. 382/217 |

OTHER PUBLICATIONS

Lee et al., Duplicate detection for symbolically compressed documents, IEEE Sep. 1999, pp. 305-308.*

(Continued)

*Primary Examiner*—Cong-Lac Huynh
(74) *Attorney, Agent, or Firm*—The Webb Law Firm

(57) ABSTRACT

Disclosed is a computer-assisted method for finding duplicate or near-duplicate documents or text spans within a document collection by using high-discriminability text fragments. Distinctive features of the documents or text spans are identified. For each pair of documents or text spans with at least one distinctive feature in common, the distinctive features of each document or text span are compared to determine whether the pair is duplicates or near-duplicates. An apparatus for performing this computer-assisted method is also disclosed.

34 Claims, 9 Drawing Sheets

OTHER PUBLICATIONS

Doermann et al., The detection of duplicates in document image databases, IEEE 1997, pp. 314-318.*

Lopresti, Models and algorithms for duplicate document detection, IEEE Sep. 1999, pp. 297-300.*

Jones et al., Phrasier: a System for Interactive Document Retrieval Using Keyphrases, ACM Aug. 1999, pp. 1-8.*

Data Structures and Algorithms; Aho et al.; Addison-Wesley Publishing Company; Apr. 1987; pp. 189-192.

What Can We Do with Small Corpora? Document Categorization Via Cross-Entropy; Patrick Juola; Proceedings of Workshoop on Similarity and Categorization, 1997.

Shivakumar et al., Finding Near-Replicas of Documents on the Web, NEC ResearchIndex, 1998, abstract.

Bharat, A Comparison of Techniques to Find Mirrored Hosts on the WWW, NEC ResearchIndex, 1999, abstract.

Chowdhury et al., Collection Statistics for Fast Duplicate Document Detection, Google search, 1999, all.

Brenda S. Baker, *On Finding Duplication and Near-Duplication in Large Software Systems*, Reverse Engineering, 1995, Proceedings of 2$^{nd}$ Working IEEE Conference, ISBN: 0-8186-7111-4; Jul. 1995, pp. 86-95; Toronto, Ontario, Canada.

* cited by examiner

METHOD AND APPARATUS FOR EFFICIENT IDENTIFICATION OF DUPLICATE AND NEAR-DUPLICATE DOCUMENTS AND TEXT SPANS USING HIGH-DISCRIMINABILITY TEXT FRAGMENTS

BACKGROUND OF THE INVENTION

1. Field of the Invention

This invention relates to a computer-assisted method and apparatus for identifying duplicate and near-duplicate documents or text spans in a collection of documents or text spans, respectively.

2. Description of the Prior Art

The current art includes inventions that compare a single pair of known-to-be-similar documents to identify the differences between the documents. For example, the Unix "diff" program uses an efficient algorithm for finding the longest common sub-sequence (LCS) between two sequences, such as the lines in two documents. Aho, Hopcroft, and Ullman, *Data Structures and Algorithms*, Addison-Wesley Publishing Company, April 1987, pages 189–192. The lines that are left when the LCS is removed represent the changes needed to transform one document into another. Additionally, U.S. Pat. No. 4,807,182 uses anchor points (points in common between two files) to identify differences between an original and a modified version of a document. There are also programs for comparing a pair of files, such as the Unix "cmp" program.

Another approach for comparing documents is to compute a checksum for each document. If two documents have the same checksum, they are likely to be identical. But comparing documents using checksums is an extremely fragile method, since even a single character change in a document yields a different checksum. Thus, checksums are good for identifying exact duplicates, but not for identifying near-duplicates. U.S. Pat. No. 5,680,611 teaches the use of checksums to identify duplicate records. U.S. Pat. No. 5,898,836 discloses the use of checksums to identify whether a region of a document has changed by comparing checksums for sub-document passages, for example, the text between HTML tags.

Patrick Juola's method, discussed in Juola, Patrick, *What Can We Do With Small Corpora? Document Categorization via Cross-Entropy*, Proceedings of Workshop on Similarity and Categorization, 1997, uses the average length of matching character n-grams (an n-gram is a string of characters that may comprise all or part of a word) to identify similar documents. For each window of consecutive characters in the source document, the average length of the longest matching sub-sequence at each position in the target document is computed. This effectively computes the average length of match at each position within the target document (counting the number of consecutive matching characters starting from the first character of the n-gram) for every possible character n-gram within the source document. This technique depends on the frequency of the n-grams within the document by requiring the n-grams and all sub-parts (at least the prefix sub-parts) to be of high frequency. The Juola method focuses on applications involving very small training corpora, and has been applied to a variety of areas, including language identification, determining authorship of a document, and text classification. The method does not provide a measure of distinctiveness.

The prior art does not compare more than two documents, does not allow text fragments in each document to appear in a different or arbitrary order, is not selective in the choice of n-grams used to compare the documents, does not use the frequency of the n-grams across documents for selecting n-grams used to compare the documents, and does not permit a mixture of very low frequency and very high frequency components in the n-grams.

SUMMARY OF THE INVENTION

It is an object of the present invention to provide a method and apparatus for the efficient identification of duplicate and near-duplicate documents and text spans.

Accordingly, I have developed a method and apparatus for the efficient identification of duplicate and near-duplicate (i.e., substantially duplicate) documents and text spans which use high-discriminability text fragments for comparing documents.

Near-duplicate documents contain long stretches of identical text that are not present in other, non-duplicate documents. The long text fragments that are present in only a few documents (high-intermediate rarity) represent distinctive features that can be used to distinguish similar documents from dissimilar documents in a robust fashion. These text fragments represent a kind of "signature" for a document which can be used to match the document with near-duplicate documents and to distinguish the document from non-duplicate documents. Documents that overlap significantly on such text fragments will most likely be duplicates or near-duplicates. Overlap occurs not just when the text is excerpted, but also when deliberate changes have been made to the text, such as paraphrasing, interspersing comments by another author, and outright plagiarism. Typically, as long as the document is not completely rewritten, there will be large text fragments that are specific to the document and its duplicates. On the other hand, text fragments in common between two non-duplicate documents will likely be in common with many other documents.

The present invention identifies duplicate and near-duplicate documents and text spans by identifying a small number of distinctive features for each document, for example, distinctive word n-grams likely to appear in duplicate or near-duplicate documents. The features act as a proxy for the full document, allowing the invention to compare documents by comparing their distinctive features. Documents having at least one feature in common are compared with each other. Near-duplicate documents are identified by counting the proportion of the features in common between the two documents. Using these common features allows the present invention to find near-duplicate documents efficiently without needing to compare each document with all the other documents in the collection, for example, by pairwise comparison. By comparing features instead of entire documents, the present invention is much faster in finding duplicate and near-duplicate documents in a large collection of documents than might be possible with prior document comparison algorithms.

A key to the effectiveness of this method is the ability to find distinctive features. The features need to be rare enough to be common among only near-duplicate documents, but not so rare as to be specific to just one document. An individual word may not be rare enough, but an n-gram containing the word might be. Longer n-grams might be too rare. Additionally, the distinctive features may include glue words (i.e., very common words) within the features but, preferably, not at either end. Thus, distinctive features may include words that are common to just a few documents and/or words that are common to all but a few documents.

Blindly gathering all n-grams of appropriate rarity would yield a computationally expensive algorithm. Thus, the number of distinctive features used must be small in order for the algorithm to be computationally efficient. The present invention incorporates several methods that strike a balance between appropriate rarity and computational expense.

Applications of the present invention include removing redundancy in document collections (including web catalogs and search engines), matching summary sentences with corresponding document sentences, and detection of plagiarism and copyright infringement for text documents and passages.

DESCRIPTION OF THE PREFERRED EMBODIMENTS

Figure 1:
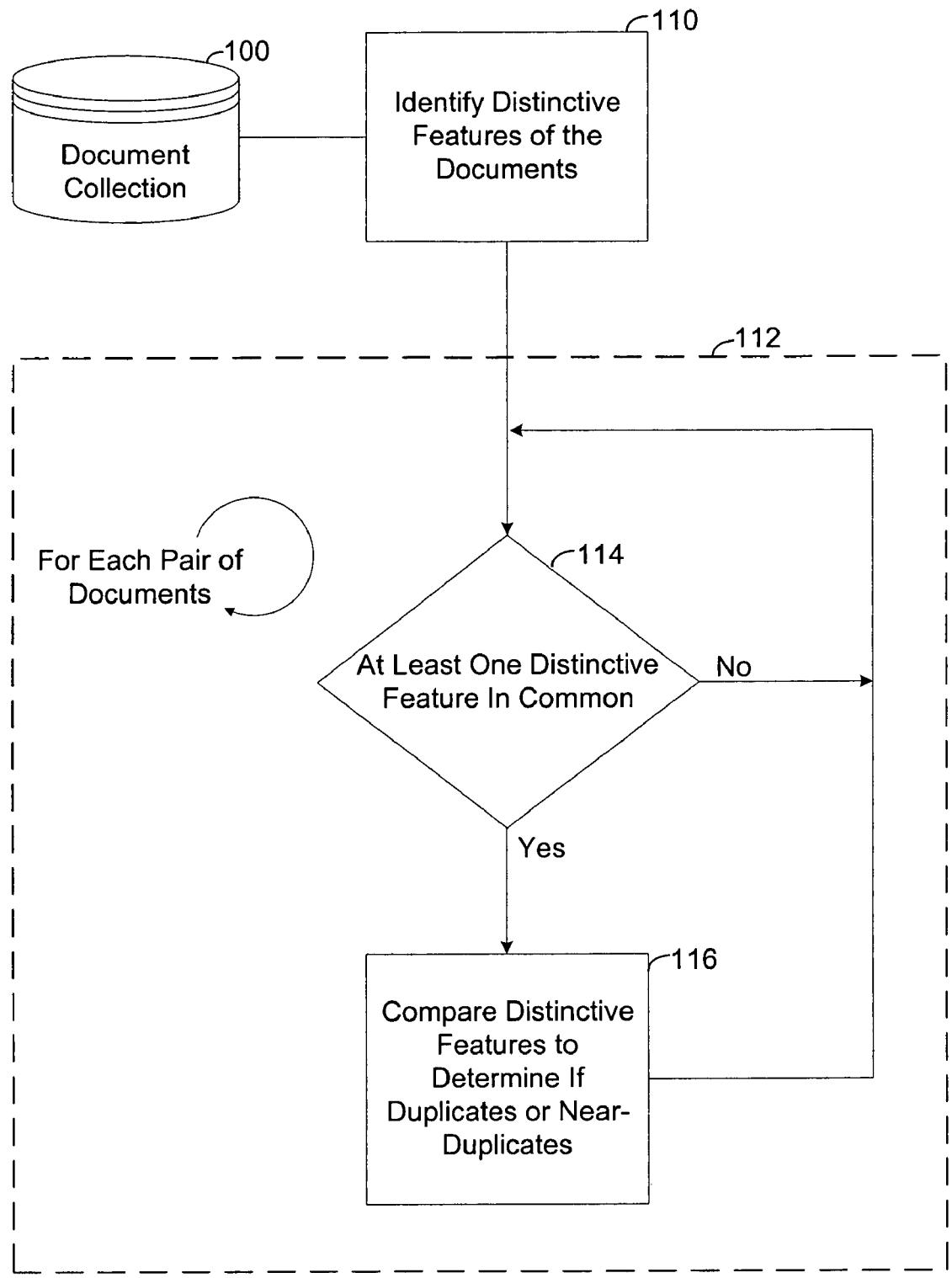
FIG. 1 is a flow diagram of a first embodiment of a method according to the present invention as applied to documents.

Referring to FIG. 1, the present invention is utilized to find duplicate or near-duplicate documents within a document collection 100. Step 110 identifies distinctive features in the document collection 100 and in each document in the collection 100. Loop 112 iterates for each pair of documents. Within loop 112, step 114 determines if the pair of documents has at least one distinctive feature in common. If they do, the pair is compared in step 116 to determine if they are duplicate or near-duplicate documents. Loop 112 then continues with the next pair of documents. If the pair of documents does not have at least one distinctive feature in common, no comparison is performed, and loop 112 continues with the next pair of documents.

The method illustrated in FIG. 1 can be applied to, for example: removing duplicates in document collections; detecting plagiarism; detecting copyright infringement; determining the authorship of a document; clustering successive versions of a document from among a collection of documents; seeding a text classification or text clustering algorithm with sets of duplicate or near-duplicate documents; matching an e-mail message with responses to the e-mail message, and vice versa; and creating a document index for use with a query system to efficiently find documents that contain a particular phrase or excerpt in response to a query, even if the particular phrase or excerpt was not recorded correctly in the document or the query.

The method can also be applied to augmenting information retrieval or text classification algorithms that use single-word terms with a small number of multi-word terms. Algorithms of this type that are based on a bag-of-words model assume that each word appears independently. Although such algorithms can be extended to apply to word bigrams, trigrams, and so on, allowing all word n-grams of a particular length rapidly becomes computationally unmanageable. The present invention may be used to generate a small list of word n-grams to augment the bag-of-words index. These word n-grams are likely to distinguish documents. Therefore, if they are present in a query, they can help narrow the search results considerably. This is in contrast to methods based on word co-occurrence statistics which yield word n-grams that are rather common in the document set.

The method illustrated in FIG. 1 may be used to determine whether documents are duplicates or near-duplicates even if the distinctive features appear in a different order in each document.

The distinctive features may be distinctive text fragments found within the collection of documents 100. As such, the method may be applied to information retrieval methods, such as a text classification method or any information retrieval method that assumes word independence and adds the distinctive text fragments to an index set.

The distinctive text fragments may be sequences of at least two words that appear in a limited number of documents in the document collection 100. If one distinctive text fragment is found within another distinctive text fragment, only the longest distinctive text fragment may be considered as a feature. A sequence of at least two words may be considered as appearing in a document when the document contains the sequence of at least two words at least a user-specified minimum number of times or a user-specified minimum frequency. The frequency may be defined as the number of occurrences in the document divided by the length of the document.

For each sequence of at least two words, a distinctiveness score may be calculated and the highest scoring sequences that are found in at least two documents in the document collection 100 may be considered as text fragments. The distinctiveness score may be the reciprocal of the number of documents containing the phrase multiplied by a monotonic function of the number of words in the phrase, where the monotonic function may be the number of words in the phrase.

The limited number restricting the number of documents having the sequence of at least two words may be selected by a user as a constant or a percentage. The limited number may be defined by a linear function of the number of documents in the document collection 100, such as a linear function of the square root or logarithm of the number of documents in the document collection 100.

The distinctive text fragments may include glue words (i.e., words that appear in almost all of the documents and for which their absence is distinctive): Glue words include stopwords like "the" and "of" and allow phrases like "United States of America" to be counted as distinctive phrases. The method may exclude glue words that appear at either extreme of the distinctive text fragment. Again, the sequence of at least two words may be considered as appearing in a document when the document contains the sequence of at least two words at least a user-specified minimum number of times or a user-specified minimum frequency. The frequency may be defined as the number of occurrences in the document divided by the length of the document.

Figure 2:
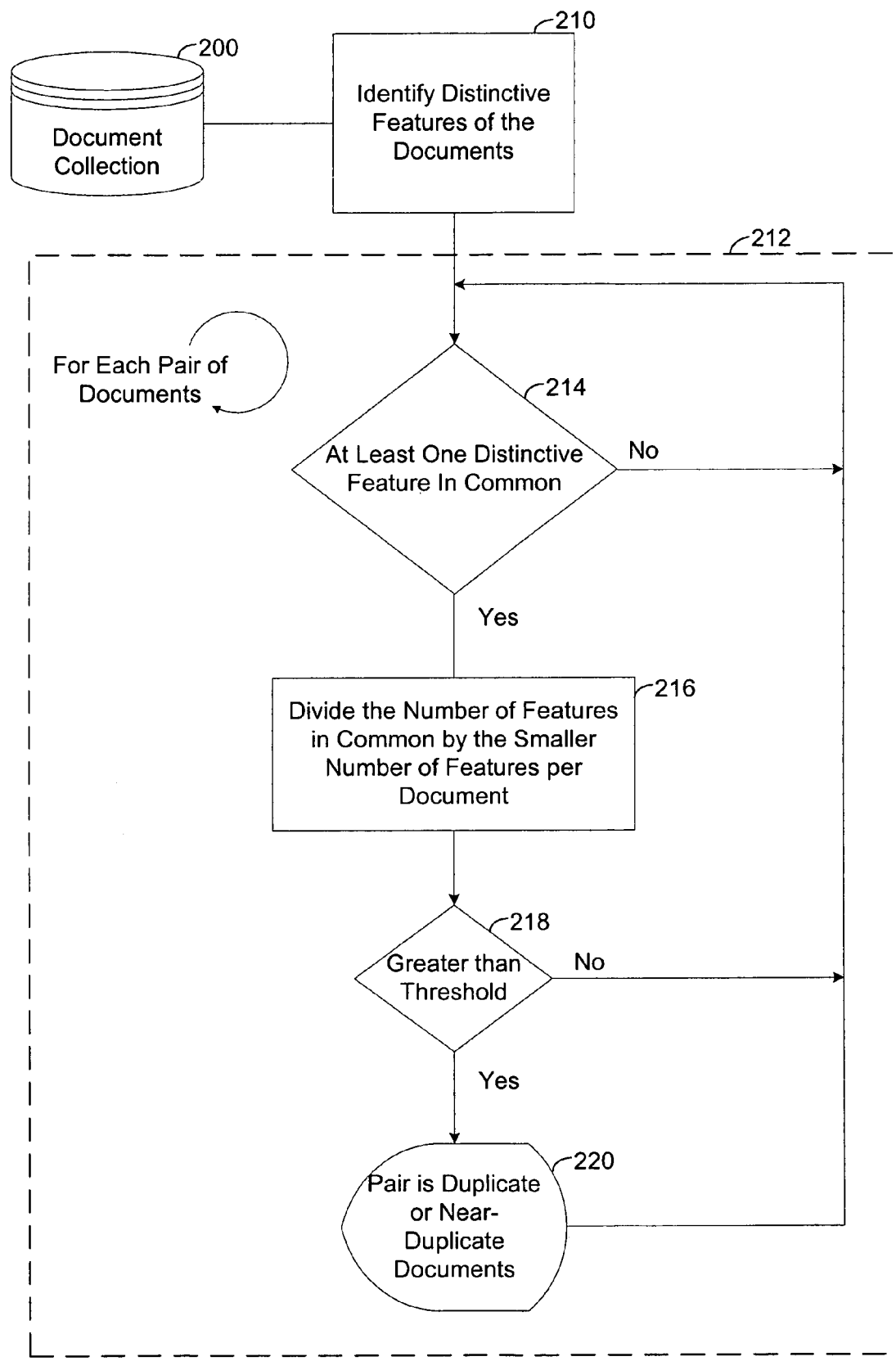
FIG. 2 is a flow diagram of a second embodiment of a method according to the present invention as applied to documents.

FIG. 2 illustrates another embodiment of the present invention which finds duplicate or near-duplicate documents within a document collection 200. Step 210 identifies distinctive features of the documents in the document collection 200 and in each document in the collection 200. Loop 212 iterates for each pair of documents. Within loop 212, step 214 determines if the pair of documents has at least one distinctive feature in common. If they do, step 216 divides the number of features that the pair of documents has in common by the smaller number of the number of features in each document. Step 218 determines whether the result of step 216 is greater than a threshold value. The threshold value may be a constant, a fixed percentage of the number of documents in the document collection 200, the logarithm of the number of documents, or the square root of the number of documents. If the result is greater than the threshold, step 220 deems the documents duplicates or near-duplicates, and loop 212 continues with the next pair of documents. If the result is not greater than the threshold, the documents are not duplicates or near-duplicates, and loop 212 continues.

Figure 3A:
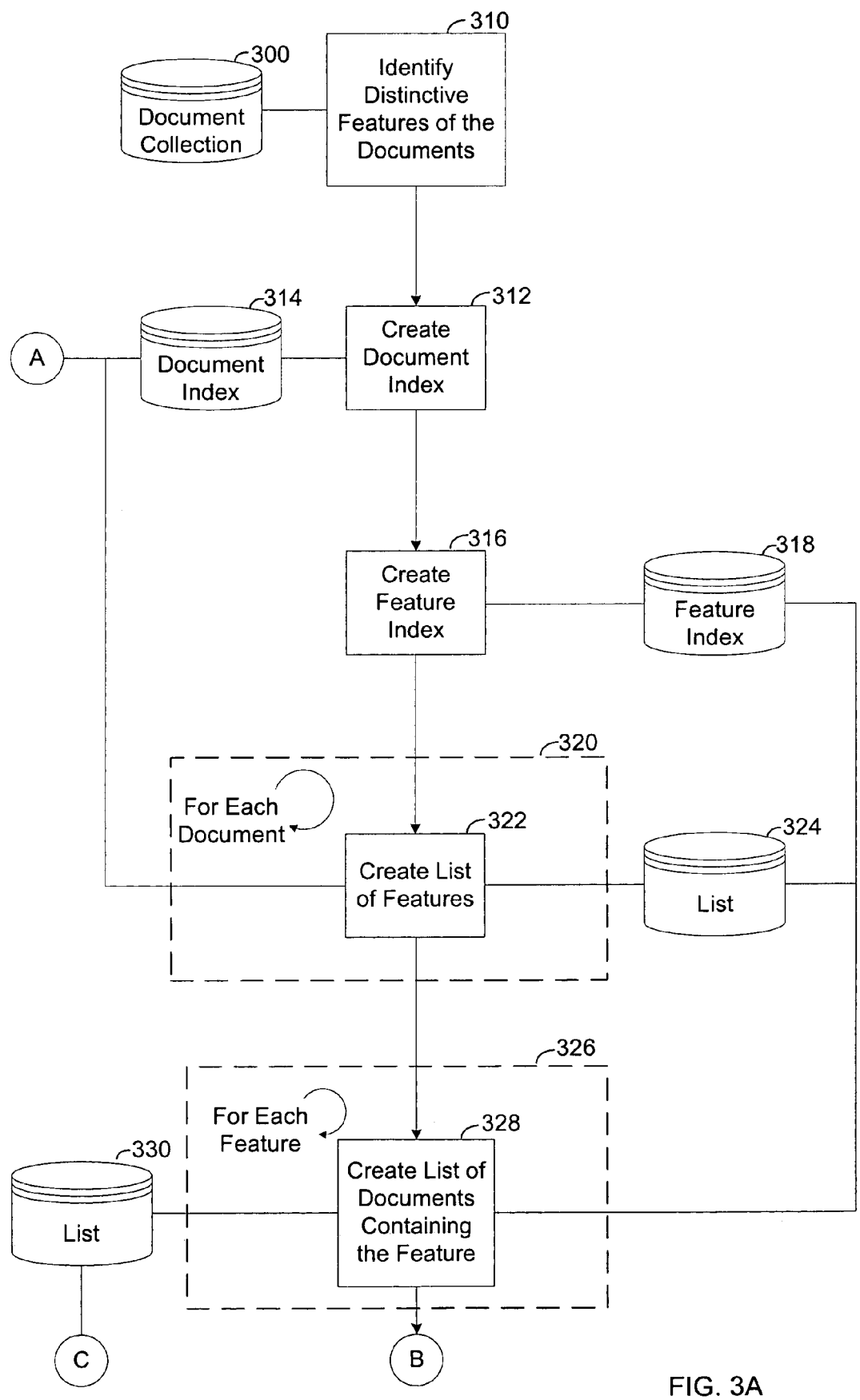
FIGS. 3A and 3B are a flow diagram of a third embodiment of a method according to the present invention as applied to documents.
Figure 3B:
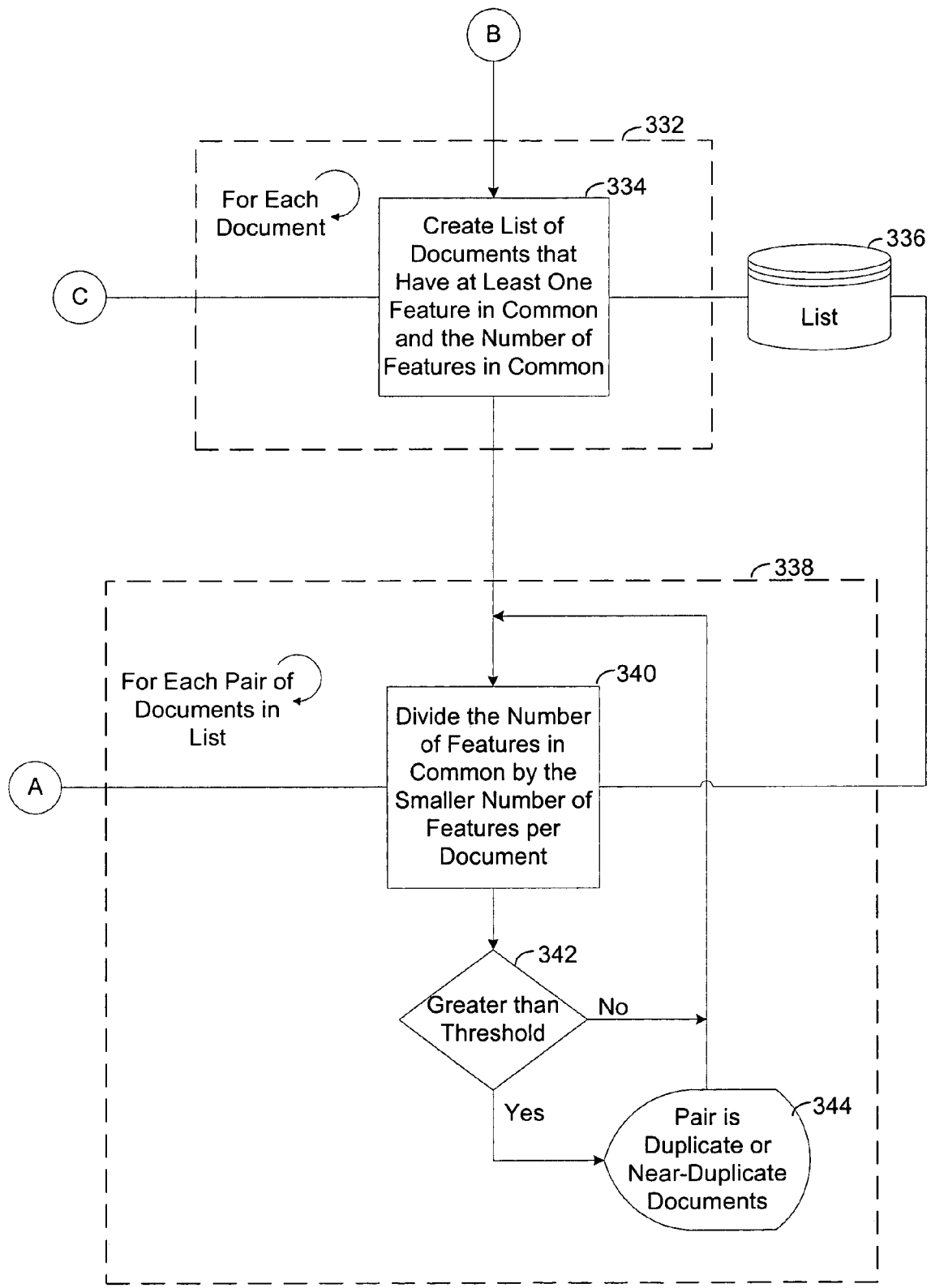

FIGS. 3A and 3B show another embodiment of the present invention which finds duplicate or near-duplicate documents within a document collection 300. Starting with FIG. 3A, step 310 identifies distinctive features of the documents in the document collection 300 and in each document in the collection 300. Step 312 builds a document index 314 and step 316 builds a feature index 318. The document index 314 maps each document to the features contained therein. The feature index 318 maps the features to the documents that contain them. The indexes 314 and 318 are built in a manner that ignores duplicates (i.e., if a feature is repeated within a document, it is mapped only once). Loop 320 iterates through each document such that step 322 can create a list 324 that includes each unique distinctive feature that was identified in step 310. For each distinctive feature in list 324, loop 326 iterates through the feature index 318 so that step 328 can create a list 330 that includes each distinctive feature and the documents in which the distinctive feature is located.

Referring now to FIG. 3B, loop 332 iterates through list 330. Within loop 332, step 334 creates a list 336 of pairs of documents that have at least one feature in common and the number of features they have in common. Loop 338 iterates through list 336. For each pair of documents in list 336, step 340 divides the number of features that the pair of documents has in common by the smaller number of the number of features in each document (from the document index 314). Step 342 determines whether the result of step 340 is greater than a threshold value. The threshold value may, for example, be a constant, a fixed percentage of the number of documents in the document collection 300, the logarithm of the number of documents, or the square root of the number of documents. If the result is greater than the threshold, step 344 deems the documents duplicates or near-duplicates, and loop 338 continues with the next pair of documents. If the result is not greater than the threshold, the documents are not duplicates or near-duplicates, and loop 338 continues.

Figure 3C:
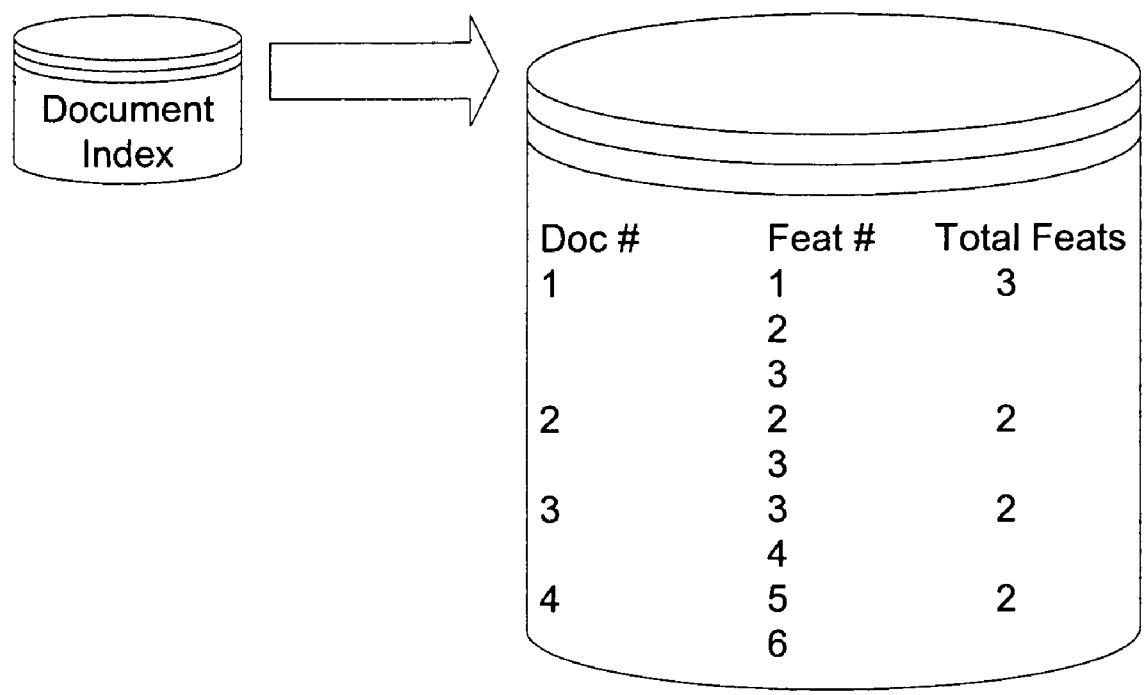
FIG. 3C is an illustration of a document index.
Figure 3D:
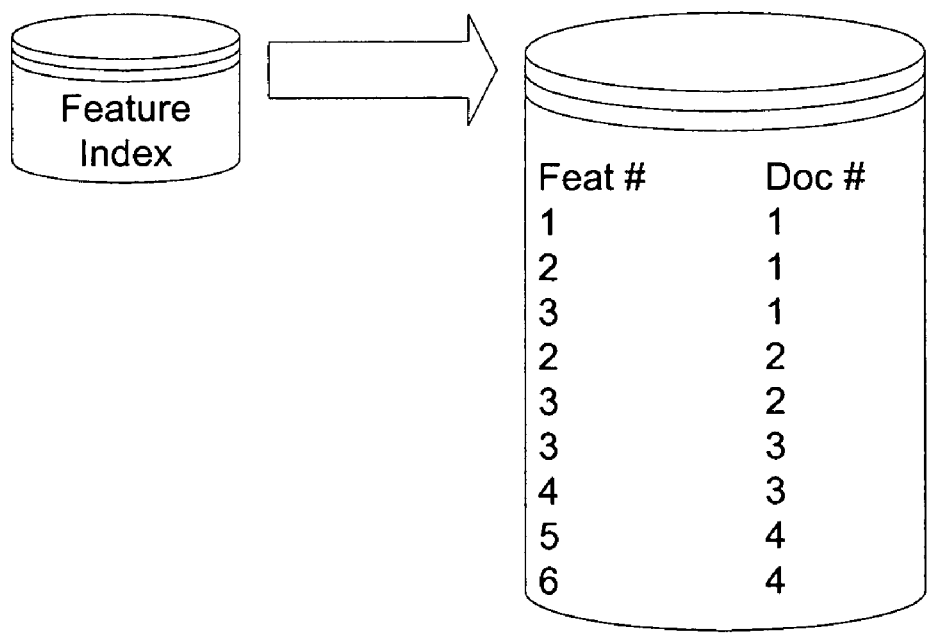
FIG. 3D is an illustration of a feature index.
Figure 3E:
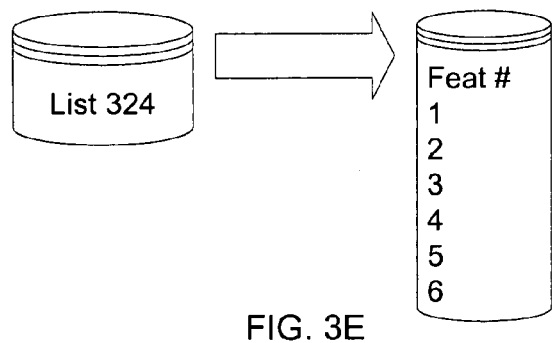
FIG. 3E is an illustration of a list 324.
Figure 3F:
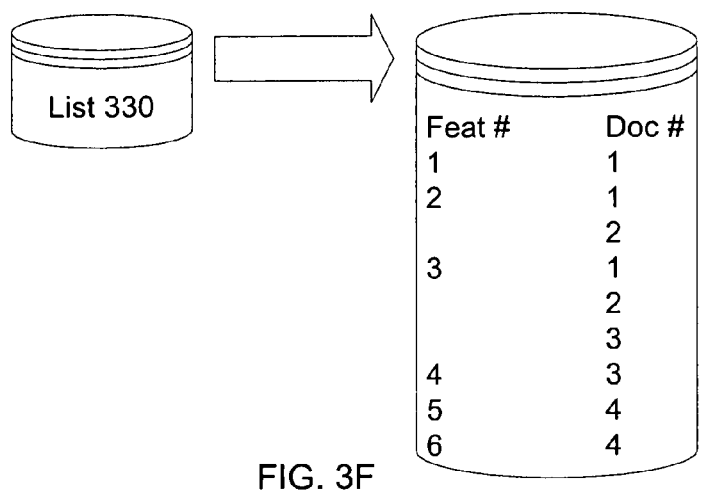
FIG. 3F is an illustration of a list 330.
Figure 3G:
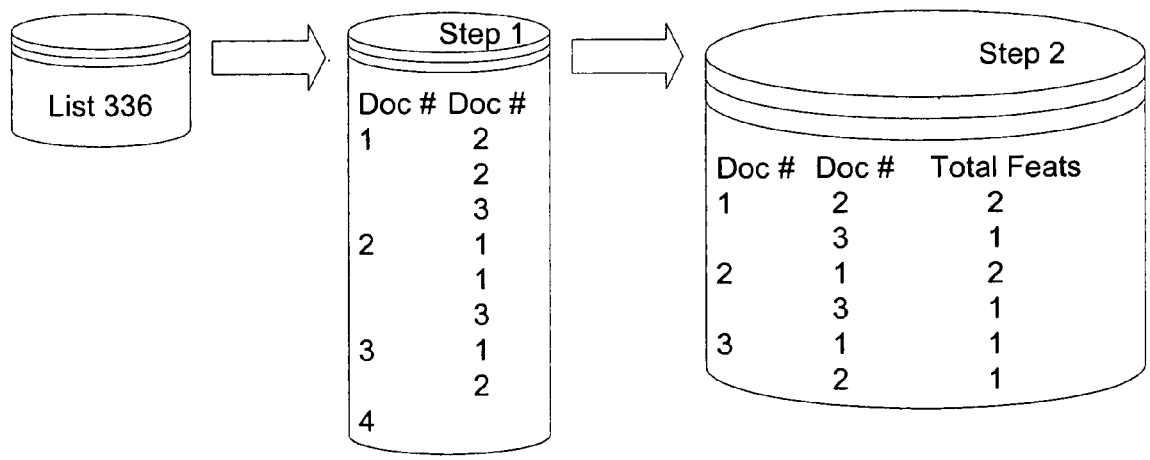
FIG. 3G is an illustration of a list 336.

FIG. 3C illustrates an example format for the document index 314. Likewise, FIG. 3D illustrates the feature index 318, FIG. 3E illustrates list 324, FIG. 3F illustrates list 330, and FIG. 3G illustrates list 336 as constructed in two steps.

Figure 4:
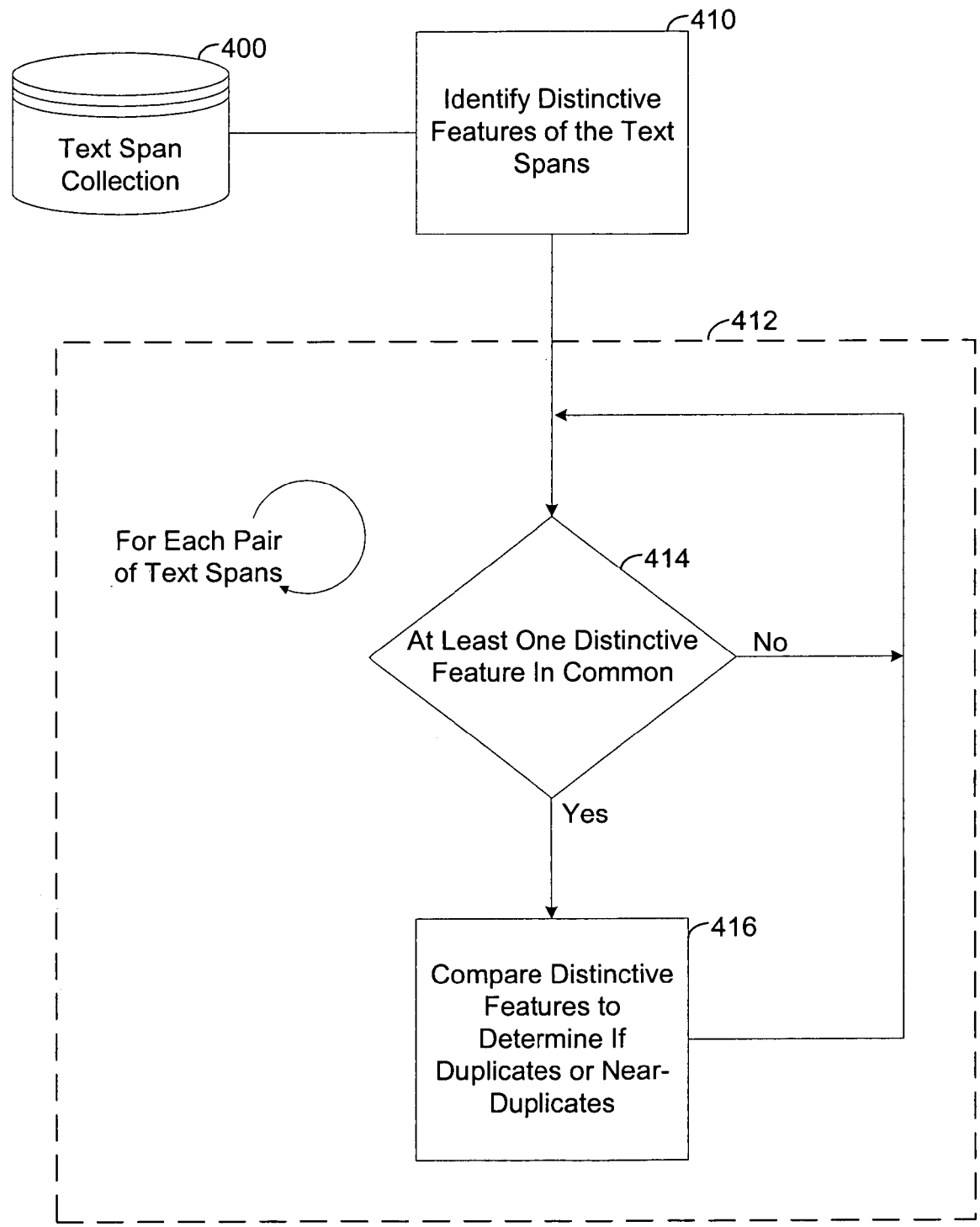
FIG. 4 is a flow diagram of an embodiment of a method according to the present invention as applied to text spans.

Referring to FIG. 4, a method according to the present invention is utilized to find duplicate or near-duplicate text spans, including sentences, within a text span collection 400. The text spans in the collection 400 may be sentences. Step 410 identifies distinctive features of the text spans in the text span collection 400 and in each text span in the collection 400. Loop 412 iterates for each pair of text spans. Within loop 412, step 414 determines if the pair of text spans has at least one distinctive feature in common. If they do, the pair is compared in step 416 to determine if they are duplicate or near-duplicate text spans. Loop 412 then continues with the next pair of text spans. If the pair of text spans does not have at least one distinctive feature in common, no comparison is performed, and loop 412 continues with the next pair of text spans.

This method may be used to match sentences from one document with sentences from another. This would be useful in matching sentences of a human-written summary for an original document with sentences from the original document. Similarly, in a plagiarism detector, once the method as applied to documents has found duplicate documents, the sentence version can be used to match sentences in the plagiarized copy with the corresponding sentences from the original document. Another application of sentence matching would identify changes made to a document in a word processing application where such changes need not retain the sentences, lines, or other text fragments in the original order.

Figure 5:
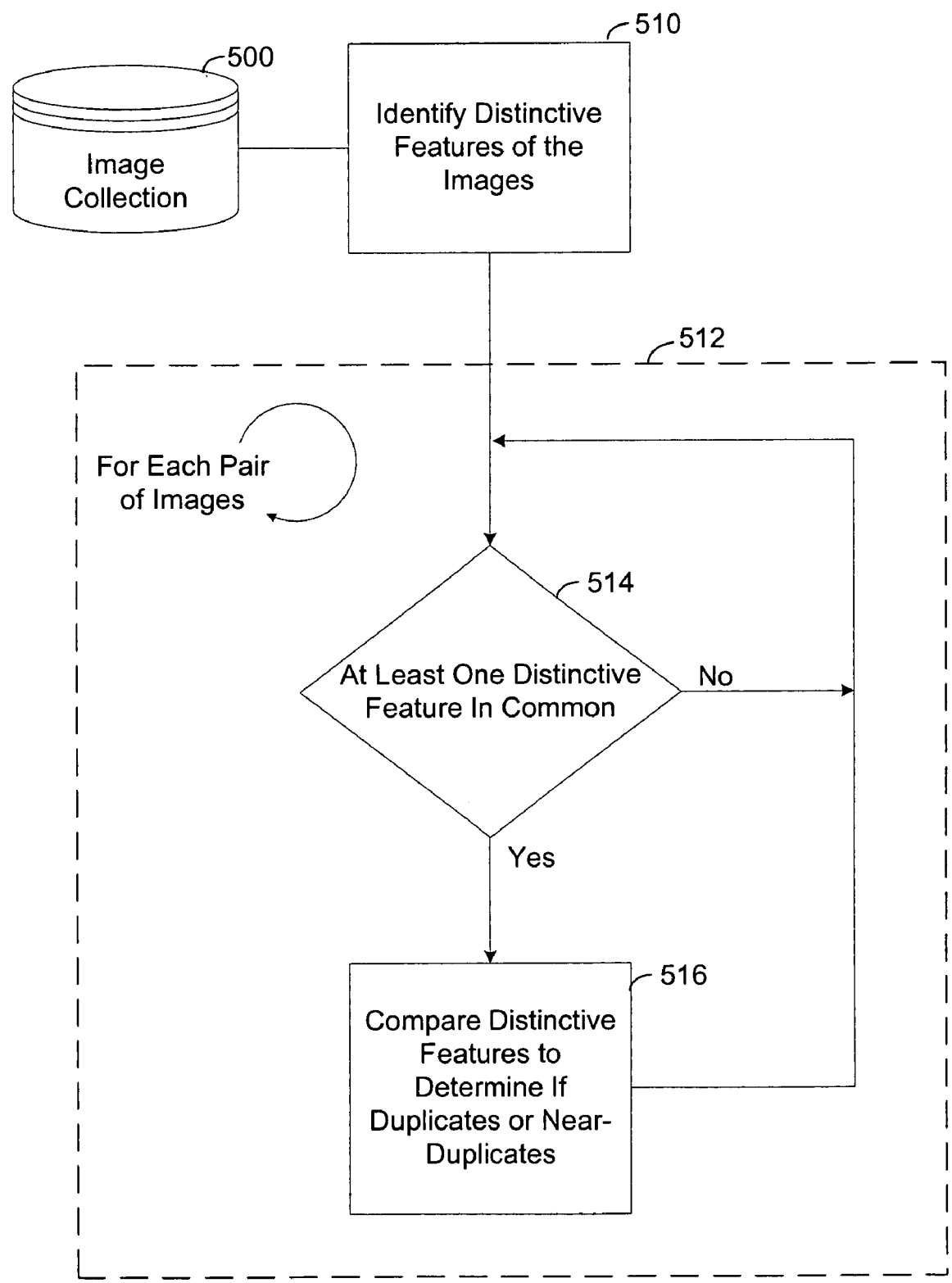
FIG. 5 is a flow diagram of an embodiment of a method according to the present invention as applied to images.

Referring to FIG. 5, the present invention is utilized to find duplicate or near-duplicate images within an image collection 500. Step 510 identifies distinctive features of the images in the image collection 500 and in each image in the collection 500. The distinctive features may be sequences of at least two adjacent tiles from the images. Loop 512 iterates for each pair of images. Within loop 512, step 514 determines if the pair of images has at least one distinctive feature in common. If they do, the pair is compared in step 516 to determine if they are duplicate or near-duplicate images. Loop 512 then continues with the next pair of images. If the pair of images does not have at least one distinctive feature in common, no comparison is performed, and loop 512 continues with the next pair of images.

In a preferred embodiment of the invention according to the method illustrated in FIG. 5, the method performs canonicalization of the images by converting them to black and white and sampling them at several resolutions. As compared to the method applied to text, small overlapping tiles correspond to words and horizontal and vertical sequences to text fragments.

The method illustrated in FIG. 5 may be applied to detecting copyright infringement based on image content where the original image does not have a digital watermark. This method may also be applied to fingerprint identification or handwritten signature authentication, among other applications.

The present invention also includes an apparatus that is capable of identifying duplicate and near-duplicate documents in a large collection of documents. The apparatus includes a means for initially selecting distinctive features contained within the collection of documents, a means for subsequently identifying the distinctive features contained in each document, and a means for then comparing the distinctive features of each pair of documents having at least one distinctive feature in common to determine whether the documents are duplicate or near-duplicate documents.

Figure 6:
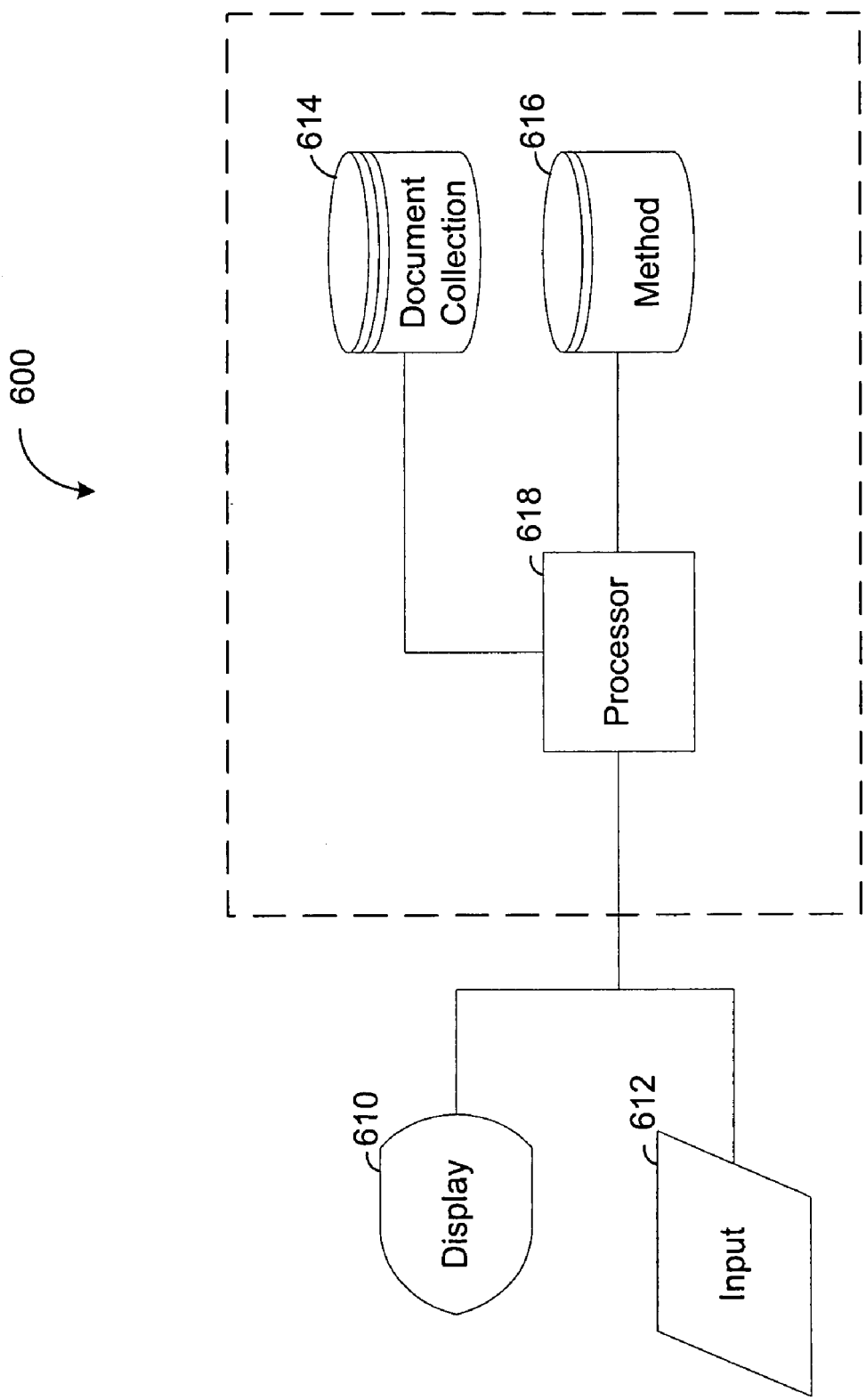
FIG. 6 is an illustration of an apparatus according to the present invention.

FIG. 6 illustrates an embodiment of an apparatus of the present invention capable of enabling the methods of the present invention. A computer system 600 is utilized to enable the method. The computer system 600 includes a display unit 610 and an input device 612. The input device 612 may be any device capable of receiving user input, for example, a keyboard or a scanner. The computer system 600 also includes a storage device 614 for storing the document collection and a storage device 616 for storing the method according to the present invention. A processor 618 executes the method stored on storage device 616 and accesses the document collection stored on storage device 614. The processor is also capable of sending information to the display unit 610 and receiving information from the input device 612. Any type of computer system having a variety of software and hardware components which is capable of enabling the methods according to the present invention may be used, including, but not limited to, a desktop system, a laptop system, or any network system.

The present invention was implemented in accordance with the method illustrated in FIGS. 3A and 3B. In the implementation, $DF(x)$ was the number of documents containing the text "x", N was the overall number of documents, and R was a threshold on DF. Possible choices for R included a constant, a fixed percentage of N (for example five percent), the logarithm of N, or the square root of N.

A first pass over all the documents computed $DF(x)$ for all words in the documents after converting the words to lowercase and removing punctuation from the beginning and end of the word. Optionally, a word in a particular document may be restricted from contributing to $DF(x)$ if the word's frequency in that document falls below a user-specified threshold.

A second pass gathered the distinctive features or phrases. A phrase consisted of at least two words which occur in more than one document and in no more than R documents ($1<DF(x)<R$). The phrases also contained glue words that occurred in at least (N−R) documents. The glue words could appear within a phrase, but not in the leftmost or rightmost position in the phrase. Essentially, the document was segmented at words of intermediate rarity ($R<DF(x)<R-N$) and what remained were considered distinctive phrases. Optionally, the phrases may also be segmented at the glue words to obtain additional distinctive sub-phrases, for example, "United States of America" yields "United States" upon splitting at the "of". The second pass also built a document index that mapped each document to its set of distinctive phrases and sub-phrases using a document identifier and a phrase identifier and built a phrase index that mapped from the phrases to the documents that contained them using the phrase and document identifiers. The indexes were built in a manner that ignores duplicates.

Unlike single words of low DF, the phrases were long enough to distinguish documents that happened to use the same vocabulary, but short enough to be common among duplicate documents.

A third pass iterated over the document identifiers in the document index (it is not necessary to use the actual documents once the indexes are built). For each document identifier, the document index was used to gather a list of the phrase identifiers. For each phrase identifier, the document identifiers obtained from the phrase index was iterated over to count the total number of times each document identifier occurred. Thus, for each document identifier, a list of documents that overlap with the document in at least one phrase and the number of phrases that overlap was generated. This list of document identifiers included only those documents that had at least one phrase in common with the source document in order to avoid the need to compare the source document with every other document. For each pair of documents, an overlap ratio was calculated by dividing the number of common phrases by the smaller of the number of phrases in each document. This made it possible to detect a small passage excerpted from a longer document. The overlap ratio was compared with a match percentage threshold. If it exceeded the threshold, the pair was reported as potential near-duplicates. Optionally, the results may be accepted as is or a more detailed comparison algorithm may be applied to the near-duplicate document pairs.

This implementation is rather robust since small changes to a document have little impact on the effectiveness of the method. If there are any telltale signs of the original document left, this method will find them. Moreover, the distinctive phrases do not need to appear in the same order in the duplicate documents.

The implementation is also very efficient. The first two passes are linear in N. The third pass runs in time N*P, where P is the average number of documents that overlap in at least one phrase. In the worst case P is N, but typically P is R. Note that as R increases, so does the accuracy, but the running time also increases. So, there is a trade-off between running time and accuracy. In practice, however, an acceptable level of accuracy is achieved for a running time that is linear in N. This is a significant improvement over algorithms which would require pairwise comparisons of all the documents, or at least N-squared running time.

The implementation was executed on 125 newspaper articles and their corresponding human-written summaries, for a total of 250 documents. For each pair of documents identified as near-duplicates, if the pair consisted of an article and its summary, it was counted as a correct match. Otherwise, it was counted as an incorrect match. For the purpose of the experiment, pairs consisting of a document and itself were excluded because the implementation successfully matches any document with itself. Using a minimum overlap threshold of 25% and a DF threshold of 5%, the method processed all 250 documents in 13 seconds and was able to match 232 of the 250 documents with their corresponding summary or article correctly, and none incorrectly. This represents a precision (accuracy) of 100%, a recall (coverage) of 92.8%, and an F1 score (harmonic mean of precision and recall) of 96.3%. Inspection of the results showed that in all cases where the algorithm did not find a match, the highest ranking document, although below the threshold, was the correct match.

The implementation may use different thresholds for the low frequency and glue words. Sequences of mid-range DF words where the sequence itself has low DF, may be included. Additionally, the number of words in a phrase may be factored in as a measure of the phrase's complexity in addition to rarity, for example, dividing the length of the phrase by the phrase's DF (TL/DF or log(TL)/DF). Although, this yields a preference for longer phrases, it allows longer phrases to have higher DF and, thus, be less distinctive.

It will be understood by those skilled in the art that while the foregoing description sets forth in detail preferred embodiments of the present invention, modifications, additions, and changes may be made thereto without departing from the spirit and scope of the invention. Having thus described my invention with the detail and particularity required by the Patent Laws, what is desired to be protected by Letters Patent is set forth in the following claims.

I claim:

1. A computer-assisted method for identifying duplicate and near-duplicate documents in a large collection of documents, comprising the steps of:
   initially, selecting distinctive features contained in the collection of documents,
   then, for each document, identifying the distinctive features contained in the document, and
   then, for each pair of documents having at least one distinctive feature in common, comparing the distinctive features of the documents to determine whether the documents are duplicate or near-duplicate documents, wherein the distinctive features are text fragments, which are sequences of at least two words that appear in a limited number of documents in the document collection, wherein the text fragments are determined to be distinctive features based upon a function of the frequency of a text fragment within a document in the large collection of documents, wherein for each sequence of at least two words, a distinctiveness score is calculated, and the highest scoring sequences that are found in at least two documents in the document collection are considered distinctive text fragments, wherein the distinctiveness score is the reciprocal of the number of documents containing the text fragment multiplied by a monotonic function of the number of words in the text fragment.

2. The computer-assisted method according to claim 1, wherein the method is applied to removing duplicates in document collections; detecting plagiarism, detecting copyright infringement; determining the authorship of a document; clustering successive versions of a document from among a collection of documents; seeding a text classification or text clustering algorithm with sets of duplicate or near-duplicate documents; matching an e-mail message with responses to the e-mail message; matching responses to an e-mail message with the e-mail message; creating a document index for use with a query system to efficiently find documents in response to a query which contain a particular phrase or excerpt, or any combination thereof.

3. The computer-assisted method according to claim 2, wherein the document index can be utilized even if the particular phrase or excerpt was not recorded correctly in the document or in the query.

4. The computer-assisted method according to claim to 1, wherein the distinctive features appear in a different order in each of the documents.

5. The computer-assisted method according to claim 1, wherein the method is applied to information retrieval methods.

6. The computer-assisted method according to claim 5, wherein a text classification method is applied to the information retrieval method.

7. The computer-assisted method according to claim 5, wherein:
the information retrieval method assumes word independence, and
the distinctive text fragments are added to an index set.

8. The computer-assisted method according to claim 1, wherein if one distinctive text fragment is contained within another distinctive text fragment within the same document, only the longest distinctive text fragment is considered as a distinctive feature.

9. The computer-assisted method according to claim 1, wherein the sequences of at least two words are considered as appearing in a document when the document contains the sequence of a user-specified minimum frequency.

10. The computer-assisted method according to claim 1, wherein the monotonic function is the number of words in the text fragment.

11. The computer-assisted method according to claim 1, wherein the limited number is selected by a user.

12. The computer-assisted method according to claim 1, wherein the limited number is defined by a linear function of the number of documents in the document collection.

13. The computer-assisted method according to claim 1, wherein the distinctive text fragments include glue words.

14. The computer-assisted method according to claim 13, wherein the glue words do not appear at either extreme of the distinctive text fragments.

15. A computer-assisted method for identifying duplicate and near-duplicate documents in a large collection of documents, comprising the steps of:
initially, selecting distinctive features contained in the collection of documents,
then, for each document, identifying the distinctive features contained in the document, and
then, for each pair of documents having at least one distinctive feature in common, comparing the distinctive features of the documents to determine whether the documents are duplicate or near-duplicate documents,
wherein the distinctive features are text fragments, which are sequences of at least two words that appear in a limited number of documents in the document collection,
wherein the text fragments are determined to be distinctive features based upon a function of the frequency of a text fragment within a document in the large collection of documents,
further including the step of, for each pair of documents having at least one distinctive feature in common, counting the number of distinctive features in common,
wherein determining whether the pair of documents is duplicates or near-duplicates includes the steps of:
for each pair of documents, calculating an overlap ratio by dividing the number of distinctive features in common by the smaller of the number of distinctive features per document, and
comparing the overlap ratio to a threshold and if the overlap ratio is greater than the threshold, then the pair of documents are duplicates or near-duplicates, otherwise the pair of documents is not duplicates or near-duplicates,
building a document index that maps each document to its associated distinctive features, wherein if one distinctive feature is repeated within one document the index maps the document to the distinctive feature once, and
building a feature index that maps each distinctive feature to its associated document, wherein if one distinctive feature is repeated within one document, the index maps the distinctive feature to the document once,
wherein determining whether the pair of documents are duplicates or near-duplicates further includes the steps of:
creating a list of unique distinctive features from the document index,
for each unique distinctive feature, creating a list of documents which contain the unique distinctive feature, and
for each document, creating a list of documents that have at least one feature in common with the document and the number of features in common with the document.

16. The computer-assisted method according to claim 15, wherein the distinctive features include distinctive phrases.

17. The computer-assisted method according to claim 15, wherein the distinctive features appear in a different order in each of the documents.

18. The computer-assisted method according to claim 15, wherein the distinctive features include text spans.

19. The computer-assisted method according to claim 18, wherein the text spans include sentences.

20. The computer-assisted method according to claim 18, wherein the text spans include lines of text.

21. A computer-assisted method for identifying duplicate and near-duplicate documents in a large collection of documents, comprising the steps of:
  initially, selecting distinctive features contained in the collection of documents,
  then, for each document, identifying the distinctive features contained in the document, and
  then, for each pair of documents having at least one distinctive feature in common, comparing the distinctive features of the documents to determine whether the documents are duplicate or near-duplicate documents,
  wherein the distinctive features are text fragments, which are sequences of at least two words that appear in a limited number of documents in the document collection,
  wherein the text fragments are determined to be distinctive features based upon a function of the frequency of a text fragment within a document in the large collection of documents,
  wherein for each sequence of at least two words, a distinctiveness score is calculated, and the highest scoring sequences that are found in at least two documents in the document collection are considered distinctive text fragments,
  wherein the distinctiveness score is the percentage of documents not containing the phrase multiplied by a monotonic function of the number of words in the text fragment.

22. The computer-assisted method according to claim 21, wherein the monotonic function is the number of words in the text fragment.

23. The computer-assisted method according to claim 21, wherein the method is applied to: removing duplicates in document collections; detecting plagiarism, detecting copyright infringement; determining the authorship of a document; clustering successive versions of a document from among a collection of documents; seeding a text classification or text clustering algorithm with sets of duplicate or near-duplicate documents; matching an e-mail message with responses to the e-mail message; matching responses to an e-mail message with the e-mail message; creating a document index for use with a query system to efficiently find documents in response to a query which contain a particular phrase or excerpt, or any combination thereof.

24. The computer-assisted method according to claim 23, wherein the document index can be utilized even if the particular phrase or excerpt was not recorded correctly in the document or in the query.

25. The computer-assisted method according to claim to 21, wherein the distinctive features appear in a different order in each of the documents.

26. The computer-assisted method according to claim 21, wherein the method is applied to information retrieval methods.

27. The computer-assisted method according to claim 26, wherein a text classification method is applied to the information retrieval method.

28. The computer-assisted method according to claim 26, wherein:
  the information retrieval method assumes word independence, and
  the distinctive text fragments are added to an index set.

29. The computer-assisted method according to claim 21, wherein if one distinctive text fragment is contained within another distinctive text fragment within the same document, only the longest distinctive text fragment is considered as a distinctive feature.

30. The computer-assisted method according to claim 21, wherein the sequences of at least two words are considered as appearing in a document when the document contains the sequence of a user-specified minimum frequency.

31. The computer-assisted method according to claim 21, wherein the limited number is selected by a user.

32. The computer-assisted method according to claim 21, wherein the limited number is defined by a linear function of the number of documents in the document collection.

33. The computer-assisted method according to claim 21, wherein the distinctive text fragments include glue words.

34. The computer-assisted method according to claim 33, wherein the glue words do not appear at either extreme of the distinctive text fragments.

\* \* \* \* \*